United States Patent [19]
Van Slyke

[11] 3,837,700
[45] Sept. 24, 1974

[54] INFLATABLE WEATHER SEAL FOR CAMPER-TRUCK COMBINATIONS

[76] Inventor: Gary C. Van Slyke, 317 N. Chestnut, Jefferson, Ohio 44047

[22] Filed: Aug. 23, 1972

[21] Appl. No.: 283,198

[52] U.S. Cl............................. 296/23 MC, 49/477
[51] Int. Cl............................................. B60p 3/32
[58] Field of Search .................. 296/23 MC; 49/477

[56] References Cited
UNITED STATES PATENTS

| 3,303,615 | 2/1967 | O'Neal............................ 296/23 MC |
| 3,339,931 | 9/1967 | Hundt............................... 49/477 X |
| 3,586,119 | 6/1971 | Chuchua......................... 296/23 MC |

FOREIGN PATENTS OR APPLICATIONS 525,324   5/1955   Italy....................................... 49/477

Primary Examiner—Philip Goodman
Attorney, Agent, or Firm—Watts, Hoffman, Fisher & Heinke Co.

[57] ABSTRACT

A method and apparatus for establishing a weathertight passageway between aligned window openings in opposed spaced walls of a vehicle cab and a vehicle-carried camper. A tubular inflatable weatherseal is positioned between the walls around the window openings and inflated to establish a weathertight passageway communicating the window openings.

6 Claims, 4 Drawing Figures

PATENTED SEP 24 1974 3,837,700

INFLATABLE WEATHER SEAL FOR CAMPER-TRUCK COMBINATIONS

BACKGROUND OF THE INVENTION

1. Field of the Invention

The present invention relates to a method and apparatus for establishing a weathertight passage communicating aligned openings in forward and rearward vehicle components such as aligned window openings in the rear wall of a vehicle cab and in the forward wall of a vehicle-carried camper.

2. Prior art

A number of prior art sealing devices are known for providing a peripheral weather seal around aligned cab and camper window openings. Most of such known weather seals suffer one or more of the following drawbacks:

1. Installation frequently requirs moving (if not removal from the vehicle body) of the camper to provide access to the wall surfaces around the aligned window openings; accordingly a substantial amount of time and labor can well be involved in installing the seal.
2. Installation frequently requires securing (by screws or the like) portions of the seal structure to either or both of the cab and camper; accordingly, holes frequently must be drilled in the cab and camper which may result in leakage, rusting and deterioration in value.
3. Installation frequently requires the complete removal of the window panes from either or both of the cab or camper walls; this is not only a time-consuming process, but also may cause damage to the cab or camper.
4. Removal of the camper from the vehicle for storage frequently requires that portions of the seal be detached from the cab or camper which may leave screw holes exposed to the weather as well as uncovered window openings, exposing the interior of the cab or camper to dust, dirt, rain and the like.

SUMMARY OF THE INVENTION

The present invention overcomes the foregoing drawbacks of the prior art and provides a novel and improved method and apparatus for establishing a weathertight passage between aligned openings in opposed walls of forward and rearward vehicle components such as a vehicle cab and a vehicle-mounted camper.

In accordance with one aspect of the present invention a tubular inflatable weather seal is positioned between the opposed spaced walls of a vehicle cab and camper around aligned window openings formed in the opposed walls. The seal is then expanded by inflation with compressed air to establish a continuous, firm, mating, sealing engagement with the walls in regions around the aligned window openings. In this manner, a weathertight passage is formed communicating the aligned window openings.

At opposite ends of the passageway, the seal is provided with resiliently deformable wall portions which, during inflation of the seal, are brought into continuous conforming contact with the opposed walls. Intermediate the opposed end wall portions, an expansible chamber is provided to receive and retain compressed fluid. The introduction of compressed fluid into the chamber expands the seal in such fashion as will move the resilient end wall portions away from each other and into firm sealing engagement with the opposed spaced walls of the cab and camper. A valve is provided through which compressed fluid is admitted to the chamber during installation of the seal, and through which fluid is discharged during removal of the seal.

In its simplest form, the seal comprises an endless, hollow, toroidal structure formed from an expansible material such as rubber or plastic. In the preferred embodiment, the seal is formed from a length of extruded expansible material having mating tongue and groove formations which enable opposite ends to be slip-fitted together to provide a seal of variable size.

The expansible chamber may be reinforced across its width in such fashion as will limit the expansion of the seal in radially outward directions to prevent the seal from billowing outwardly between relatively widely spaced wall regions, thereby assuring a firm and effective seal in such regions.

One feature of the seal is the ease with which it can be installed. No movement or removal of the camper is required. The seal is simply positioned in a deflated state between the cab and camper and inflated.

There is no need for any auxiliary mounting means in most applications since the firm engagement which is established between the seal and the cab and camper walls by the action of the compressed fluid will ordinarily hold the seal in place.

Still another feature is that the seal will accommodate such minor movements as may occur between the cab and camper walls without breaking the weather seal. Should the cab and camper walls be caused to move apart in one region and together in another, the compressed fluid simply redistributes itself within the chamber so as to maintain a uniform force clamping the seal to the walls.

Accordingly, it is a general object of the present invention to provide a novel and improved method and apparatus for establishing a weathertight passageway communicating aligned openings in opposed spaced walls of forward and rearward vehicle units.

Other objects and a fuller understanding of the invention may be had by referring to the following description and claims taken in conjunction with the accompanying drawings.

DESCRIPTION OF THE PREFERRED EMBODIMENT

Figure 1:
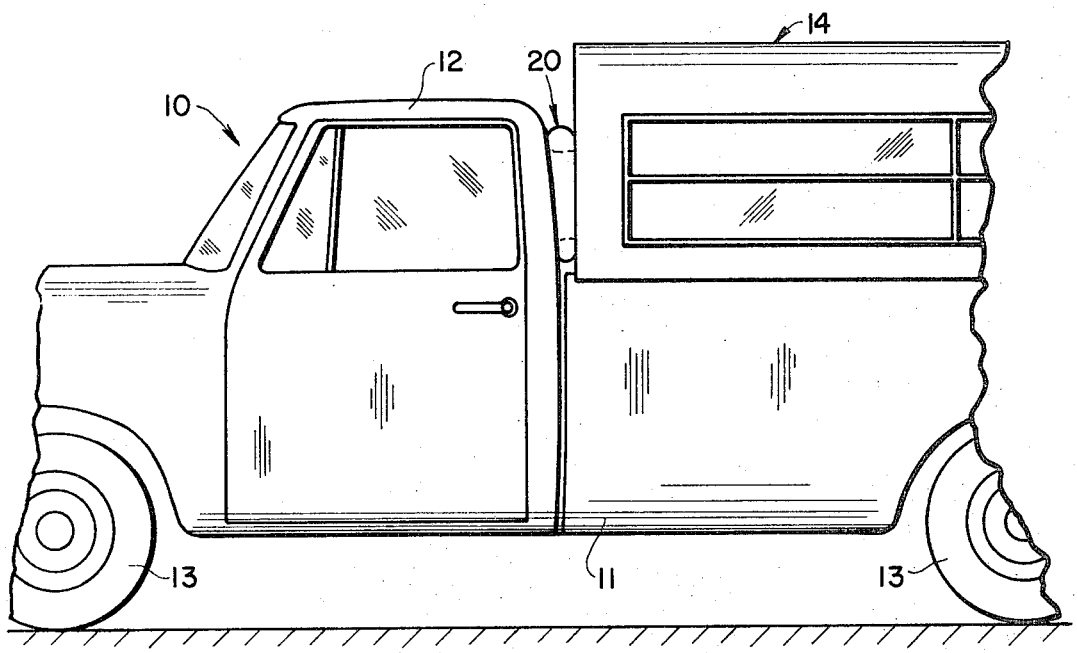
FIG. 1 is a partial side-elevational view of a truck with a camper mounted thereon and illustrating the improved weather seal of the present invention interposed between the rear wall of the truck cab and the forward wall of the camper.

Referring to FIG. 1, an over-the-highway vehicle such as a pickup truck is illustrated at 10. The truck 10 includes a body 11 having a cab 12 supported on ground engaging wheels 13. A camper 14 is mounted on the body 11 at a position spaced slightly rearwardly of the cab 12.

Figures 2, 3, 4:
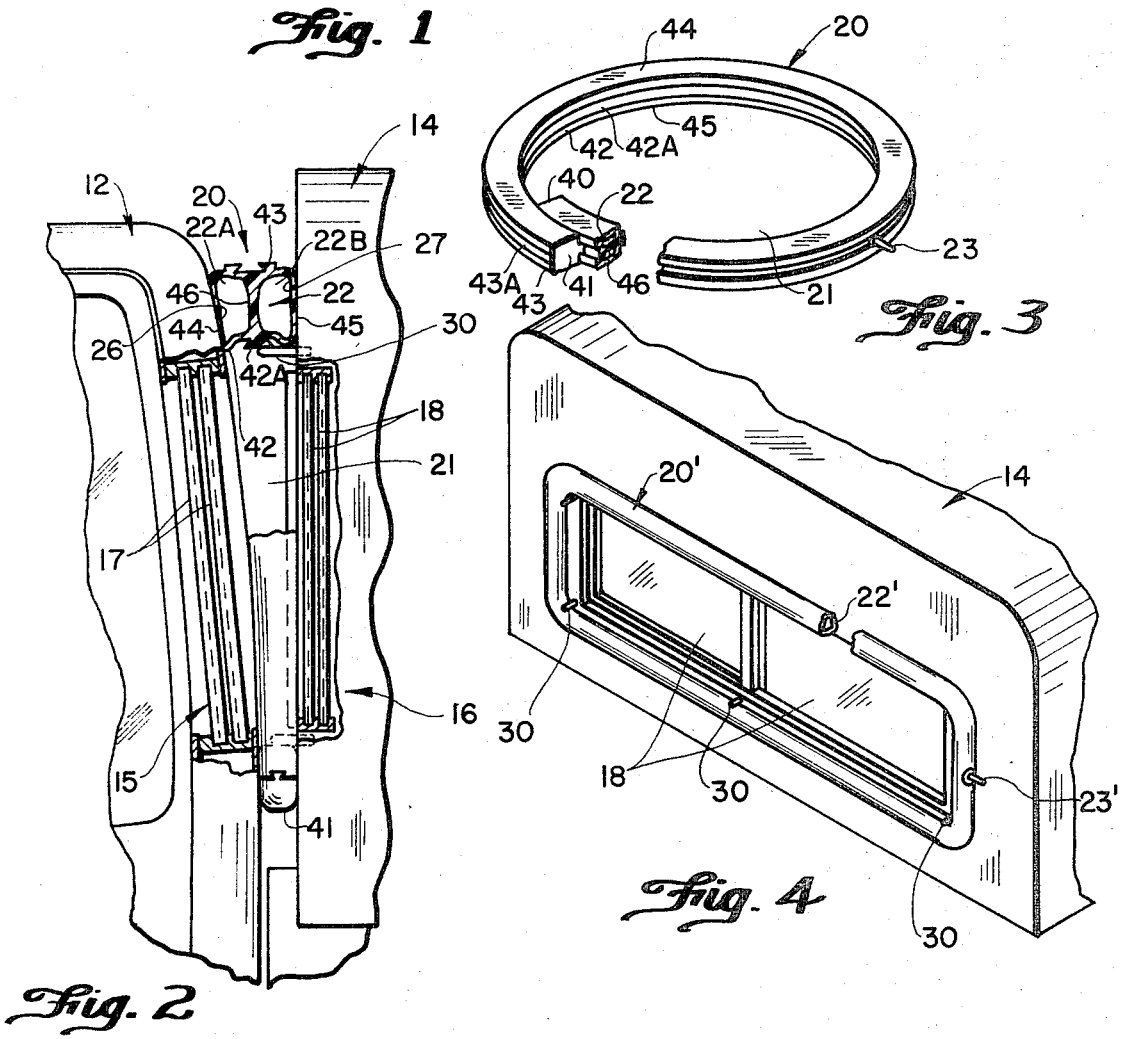
FIG. 2 is an enlarged side-elevational view of a portion of the vehicle of FIG. 1 with portions of the vehicle and the seal broken away to better illustrate the positioning and structure of the seal.
FIG. 3 is a perspective view on an enlarged scale of the preferred embodiment of the weather seal; and, FIG. 4 is a perspective view of the foward wall of the camper with another embodiment of the weather seal mounted thereon, portions of the seal being broken away to better illustrate detail.

The rear wall of the cab 12 and the forward wall of the camper 14 have aligned window openings 15, 16, respectively, as is best seen in FIG. 2. The cab 12 is provided in a known manner with sliding windows 17 which close the opening 15. The camper 14 is similarly provided with sliding windows 18 which close the opening 16.

In accordance with the present invention, a weather seal 20 is interposed between the rear wall of the cab 12 and the forward wall of the camper 14 in surrounding relationship to the window openings 15, 16. The weather seal 20 is readily positioned in place between the cab and camper while in a deflated state and is expanded to an operative configuration by air inflation.

Referring to FIGS. 2 and 3, the seal 20 in its preferred embodiment comprises a length of extruded expansible material closed at opposite ends 40, 41 and defining an expansible chamber 22. A valve 23 is provided for admitting pressurized fluid such as compressed air to the chamber 22. In the preferred embodiment, the valve 23 comprises such a valve structure as is commonly found on automotive tire inner tubes.

The seal 20 includes inner and outer wall portions 42, 43 joined at opposite ends by end wall portions 44, 45. Mating tongue and groove structures 42A, 43A are formed integrally with the inner and outer wall portions 42, 43.

The tongue and groove structures 42A, 43A permit the end regions 40, 41 to be slipped together, as best seen in FIG. 3, to define a seal of selected peripheral length. Opposite end regions of the seal 20 can be adhered together once the mating tongue and groove structures 42A, 43A have been fitted together and positioned to define a seal of desired peripheral length.

A reinforcing connecting wall 46 is preferably formed integrally with the side wall portions 42, 43. The connecting wall 46 serves to keep the central regions of the side wall portions 42, 43 at a relatively constant spacing, thereby preventing the seal from expanding appreciably in radially outward directions. It will be appreciated that especially in regions where the opposed cab and camper walls are widely spaced apart, the seal 20 will tend to billow outwardly during expansion thereby providing an imperfect seal along the cab and camper walls. The connecting wall 46 overcomes this problem and essentially confines the expansion of the seal to such an action characterized by the movement of the end walls 44, 45 away from each other and into firm mating engagement with the opposed cab and camper walls. As the end walls 44, 45 move into engagement with the cab and camper walls, they deform as required to conform to the configuration of the cab and camper walls and to provide a continuous weather seal around the aligned window openings.

The connecting wall 46 divides the inflatable chamber 22 into two compartments 22A, 22B which may be communicated along the length of the seal by apertures formed in the wall 46. Alternatively, the compartments 22A, 22B are communicated adjacent the ends 40, 41 of the seal 20 or in the region of the valve 23.

While the seal 20 will, in most installations, maintain its installed position perimetrically around the aligned window openings 15, 16 without the aid of any auxiliary positioning or clamping means, it may be desirable to provide either the rearward wall of the cab or the forward wall of the camper with a positioning means which assists in holding the seal in place. Such a positioning means can take the form of a projecting rim extending perimetrically around its associated window opening. In another embodiment, this positioning means may comprise a series of projections such as pins 30 shown in FIGS. 3 and 4. Such a positioning means serves not only to maintain the alignment of the seal 20 with the window openings 15, 16 during operation of the vehicle, but also serves to facilitate the installation of the seal around the aligned window openings.

Referring to FIG. 4, another simpler seal embodiment is shown at 20' as comprising an endless tubular seal. The seal 20' comprises a resilient material with walls of uniform thickness defining an expansible chamber 22'. A valve 23' is provided for admitting and retaining compressed fluid in the chamber 22'. The seal 20' is usable effectively where the cab and camper walls are essentially parallel and relatively closely spaced such that the seal 20' does not tend to billow outwardly and accordingly provides a continuous effective seal around the window openings.

As will be apparent, the seal 20' can take a generally rectangular configuration as shown in FIG. 4 or any of a number of other configurations as required by the size and shape of the aligned window openings in each particular installation.

Although the invention has been described in its preferred form with a certain degree of particularity, it is understood that the present disclosure of the preferred form has been made only by way of example and numerous changes in the details of construction and the combination and arrangement of parts may be resorted to without departing from the spirit and the scope of the invention as hereinafter claimed.

What is claimed is:

1. For use in conjunction with a vehicle having a cab and carrying a camper, the cab having an upstanding rear wall and the camper having an upstanding front wall, the walls being spaced apart and having substantially aligned window openings, a weather seal removably positionable between the walls in surrounding relationship to the window openings for providing a weathertight passage between the walls around the window openings, comprising:

a. seal means having portions defining expansible chamber means for receiving and retaining compressed fluid therein, said seal means being positionable between spaced cab and camper walls around alinged window openings formed therein to define a passage between the aligned window openings with said chamber means disposed peripherally about said passage;

b. said portions being expansible, at least in part, in response to the introduction of compressed fluid within said chamber means;

c. said portions being resiliently deformable, at least in part, to conform to the general configuration of such cab and camper wall surfaces as said portions may be forced to engage by the expansion of the seal under the influence of compressed fluid introduced into said chamber means;

d. valve means for controlling the retention of fluid within said chamber means; and, e. expansion control means extending through said chamber to connect opposite sides of said expansible portions together to limit the expansion of said seal means to directions which cause said deformable portions to be brought into engagement with the opposed spaced cab and camper walls;

f. whereby seal means is positionable in a deflated state between the cab and camper walls around the aligned window openings permitting the establishment of a weathertight passage between the walls by introducing compressed fluid through said valve means and into said chamber to expand said seal and bring it into continuous mating contact with the walls in regions around the aligned window openings.

2. The weather seal of claim 1 wherein said expansion control means includes a structure formed integrally with said expansible portions and extending through said chamber connecting the expansible portions on opposite sides thereof.

3. For use in conjunction with a vehicle having a cab and carrying a camper, the cab having an upstanding rear wall and the camper having an upstanding front wall, the walls being spaced apart and having substantially aligned window openings, a weather seal removably positionable between the walls in surrounding relationship to the window openings for providing a weathertight passage between the walls around the window openings, comprising:

a. seal means having portions defining expansible chamber means for receiving and retaining compressed fluid therein, said seal means being positionable between spaced cab and camper walls around aligned window openings formed therein to define a passage between the aligned window openings with said chamber means disposed peripherally about said passage;

b. said portions being expansible, at least in part, in response to the introduction of compressed fluid within said chamber means;

c. said portions being resiliently deformable, at least in part, to conform to the general configuration of such cab and camper wall surfaces as said portions may be forced to engage by the expansion of the seal under the influence of compressed fluid introduced into said chamber means;

d. valve means for controlling the retention of fluid within said chamber means;

e. whereby said seal means is positionable in a deflated state between the cab and camper walls around the aligned window openings permitting the establishment of a weathertight passage between the walls by introducing compressed fluid through said valve means and into said chamber to expand said seal and bring it into continuous mating contact with the walls in regions around the aligned window openings;

f. said seal means including:
 i. inner and outer side portions connected by end portions;
 ii. said end portions comprising such portions as are brought into engagement with said cab and camper walls during inflation of said seal means;

iii. said inner and outer side portions defining the inner and outer walls of said seal means when positioned around the aligned window openings; and,
 iv. reinforcement means extending between said inner and outer side portions to limit the movement of said side portions away from each other during expansion of said seal means during inflation to thereby confine the expansion of said seal means essentially to the moving apart of said end portions.

4. The weather seal of claim 3 wherein said reinforcement means is formed integrally with said inner and outer side portions and extends through said chamber to maintain a relative constant spacing between said side portions during inflation of said seal means.

5. A self-supporting, self-sealing tubular passage structure positionable between opposed upstanding walls of forward and rearward vehicle units to communicate in weathertight fashion substantially aligned openings in the opposed walls, comprising:

a. means defining a tubular passage including wall portions disposed peripherally about a central passageway;

b. said wall portions including opposed sealing regions disposed peripherally about said central passageway at opposite ends thereof, said sealing regions comprising a resiliently deformable material which, when compressed against a transverse, extending wall surface will deform so as to mate and seal therewith;

c. said wall portions additionally defining an expansible chamber for receiving and retaining compressed fluid therein, said chamber being so arranged that its expansion under the influence of compressed fluid introduced therein will cause said opposed sealing regions to move away from each other and into firm supporting, sealing engagement with the opposed upstanding walls between which the passage structure is positioned;

d. valve means for controlling the retention of fluid within said chamber;

e. said tubular passage structure comprising a length of extruded resilient material closed near opposite end regions having mating engagement formations formed integrally along said opposite end regions such that said opposite end regions can be secured together in such fashion as will provide a seal structure positionable around said aligned wall openings and expansible to form a weathertight passage therebetween;

f. said mating engagement formations being assemblable to permit said tubular passage structure to form a seal structure of desired peripheral length.

6. The device of claim 5 wherein said mating engagement formations comprise tongue and groove formations formed along opposite side wall portions of said tubular structure.

* * * * *